United States Patent [19]

Metz

[11] Patent Number: 5,074,510

[45] Date of Patent: Dec. 24, 1991

[54] BALLOON HOLDERS

[76] Inventor: Kurt W. Metz, 83 Mineola Rd., Fox Lake, Ill. 60020

[21] Appl. No.: 561,274

[22] Filed: Aug. 1, 1990

Related U.S. Application Data

[63] Continuation-in-part of Ser. No. 394,813, Aug. 17, 1989, abandoned.

[51] Int. Cl.[5] .............................................. F16M 11/00

[52] U.S. Cl. .................................... 248/176; 248/121; 248/346; 446/220

[58] Field of Search ............ 248/176, 121, 146, 309.1, 248/346, 500, 450, 910; 40/120; 446/220

[56] References Cited

U.S. PATENT DOCUMENTS 3,345,030 10/1967 Speers ................................ 248/346
4,531,638 7/1985 Jacobozzi et al. .............. 248/450 X
4,715,841 12/1987 Nelson et al. .................... 416/220 X
4,790,503 12/1988 Pohler ................................ 248/176
4,854,537 8/1989 Welch ................................ 248/346

*Primary Examiner*—Ramon O. Ramirez
*Attorney, Agent, or Firm*—Charles F. Meroni, Jr.

[57] ABSTRACT

A balloon holder including a synthetic plastic base member for ground engagement to support the holder. An upstanding arch-shaped ring member is integrally formed with the base member and extends upwardly therefrom from a medial location on the base member. A greeting card holder is positioned adjacent to the said arch-shaped ring member carried by the base member in integral assembly therewith. Several modifications relates to providing the base of the balloon holder with different ways for supporting a greeting card thereon.

35 Claims, 5 Drawing Sheets

BALLOON HOLDERS

This is a continuation in part of Ser. No. 07/394813 field Aug. 17, 1989, now abandoned.

BACKGROUND OF THE INVENTION

The present invention relates to several different types of helium party balloon holders which are of different shapes. The helium party balloon holder is constructed so as to be capable of having a series of mylar or latex balloons tied to it to enable the balloons to be displayed after being purchased.

The helium party ballon holders herein disclosed are basically formed from synthetic plastic as a single piece, but decals can be attached thereto for various purposes such as for ornamental dressing and also for the purpose of adding advertising or special messages to various faces of the balloon holder, as may be desired. As an example, my helium party balloon holder which is of a heart-shaped configuration can have a decal applied to it beneath the loop carrying suitable messages. The other balloon holder disclosed having the inclined flat edge base can also be decorated and supplied with decals with or without messages as may be desired.

According to important features of my invention, the upper side of the base member is provided with a loop so that balloon strings can be tied thereto. In addition, the base member of my balloon holder is provided with a series of finger-like projections or posts which are arranged in two spaced pairs, and are formed integral with the base. These posts serve to provide means for holding a greeting card in an upstanding position on the base. As an alternative form of my invention, the base can be provided with a groove and the groove can be utilized as means to support a greeting card in an upstanding position on the base.

It is believed that my different types of balloon holders that are herein disclosed are particularly advantageous over any and all devices that are presently known to exist in that it can be sold to the individual consumer or to special groups such as car dealers, marinas where they can purchase balloons for promotional purposes, and the like. The helium party balloon holders allow the owner to display balloons on tables, desks or shelves. By storing the balloons on helium party balloon holders, the balloons can be kept in a tidy way, and it will no longer be necessary for them to be held in place by a ceiling or to be tied to furniture or door handles and the like.

Another advantage of my new helium party balloon holder concerns the fact that one or all of its four sides can be decorated with a multitude of sayings, such as "Happy Retirement", "Happy Birthday", "Congratulations", and etc.

SUMMARY OF THE INVENTION

According to important features of my invention I have developed a balloon holder which includes a synthetic plastic base member for ground engagement for supporting the holder, an upstanding arch-shaped ring member integrally formed with the base member and extending upwardly therefrom from a medial location on the base member, and greeting card holding means positioned adjacent to the arch-shaped ring member carried by the base member in integral assembly therewith.

Other features of my invention relate to the greeting card holding means being comprised of spaced finger-like posts oriented for supporting a greeting card between the projections.

Yet other features of my invention relate to the projections being arranged in two sets of posts and with the sets being spaced apart for supporting a greeting card at spaced locations providing two separate support points for the greeting card.

Another feature of my invention relates to the card holding means comprising a groove formed in the base member adjacent to the arch-shaped ring member carried by the base member in integral assembly therewith.

Still another feature relates to a combination which includes a helium balloon holder and a helium balloon having a balloon string. The holder includes the following: a synthetic plastic base member for ground engagement for supporting the holder, an arch-shaped ring member integrally formed with the base member and extending outwardly therefrom, the balloon string being attached to the ring member, and greeting card holding means for holding a greeting card in an upright position, the means being positioned adjacent to the arch-shaped ring member carried by the base member in integral assembly therewith.

Further features of my invention relate to a balloon holder for a lighter than air gas filled balloon that is shaped for receiving ballast internally thereof and which includes a synthetic plastic shell-shaped base member for ground engagement for supporting the holder, an outwardly extending ring member integrally formed with the base member and extending outwardly therefrom, greeting card holding means for holding a greeting card in an upright position, the means being positioned adjacent to the ring member carried by the base member in integral assembly therewith, a base plate mounted on an underside of the shell-shaped base member, and means for securing the shell-shaped base member and the base member together.

BRIEF DESCRIPTION OF THE DRAWINGS

Other objects and features of the present invention will become more fully apparent in view of the following more detailed description taken in conjunction with the accompanying drawings disclosing several embodiments, wherein.

DESCRIPTION OF PREFERRED EMBODIMENTS

Figure 1:
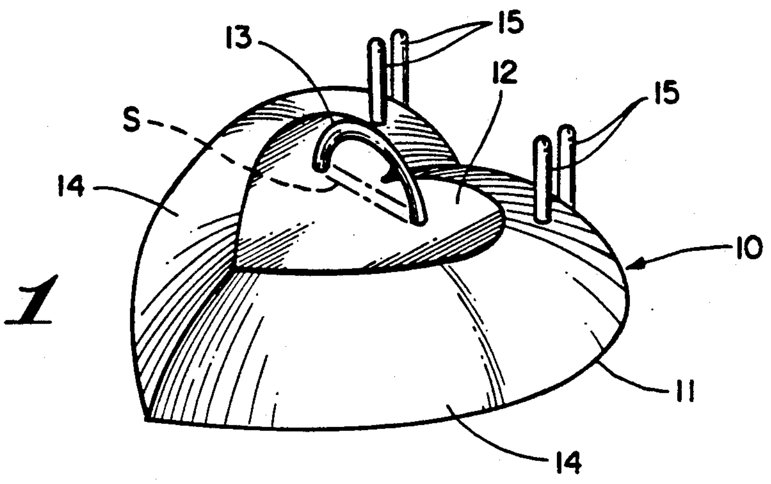
FIG. 1 is a perspective view of my heart-shaped balloon holder.
Figure 2:
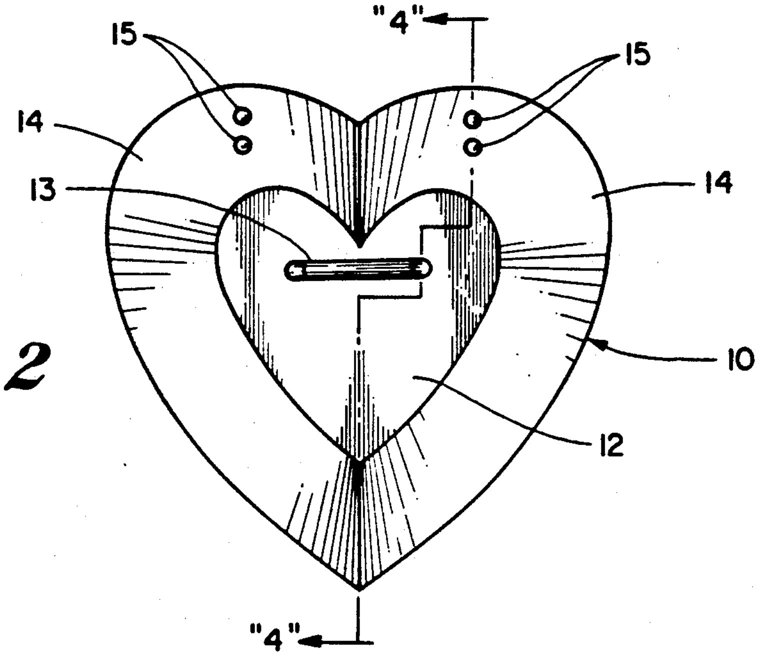
FIG. 2 is a top plan view of the balloon holder shown in FIG. 1.

The reference numeral 10 indicates one of several preferred forms of my helium party balloon holder, as shown in FIG. 1. The balloon holder 10 is comprised of a hollow body member or base member 11 for ground engagement for supporting the holder. The base or body member 11 is of a heart-shaped configuration so that it is particularly adapted for certain types of party events such as birthday parties, anniversaries, and the like. Provided on the base or body member 11 is a flat decal 12 which is also of a heart-shaped configuration. The lower semi-elliptical configuration of the base or body member 11 has a larger dimension than the upper generally semi-elliptical configuration afforded by the upper surface carrying the flat decal 12. Thus, we have upper and lower semi-elliptical configurations which are separated by a semi-elliptical curved face F. The decal 12 has a heart-shaped configuration that is of a smaller size than the heart-shaped configuration of the base or body member 11, but the two of them are similarly configurated with the smaller decal being centered with respect to the base or body member 11. More particularly, the decal 12 is mounted upon a flat surface provided on the top side of the base or body member 11.

Figure 4:
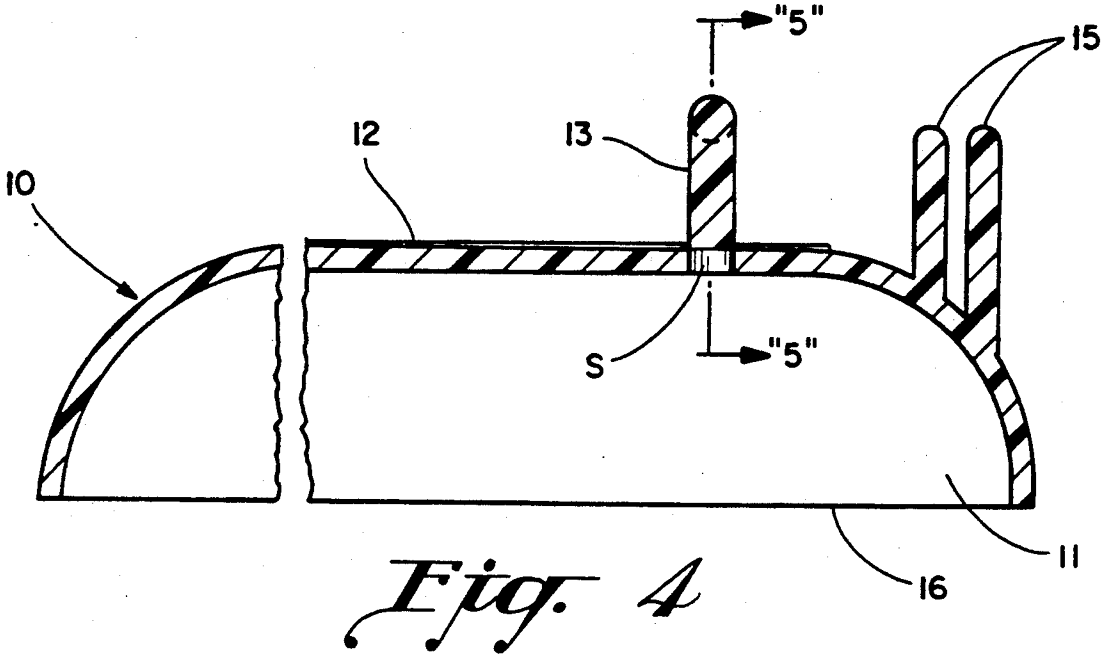
FIG. 4 is a vertical section taken on the line 4—4 looking in the direction indicated by the arrows as seen in FIG. 2.
Figure 5:
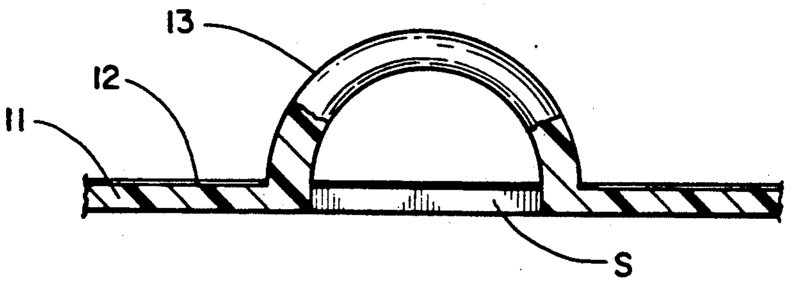
FIG. 5 is an enlarged fragmentary cross sectional view taken on the line 5—5 looking in the direction indicated by the arrows as seen in FIG. 4.
Figure 6:
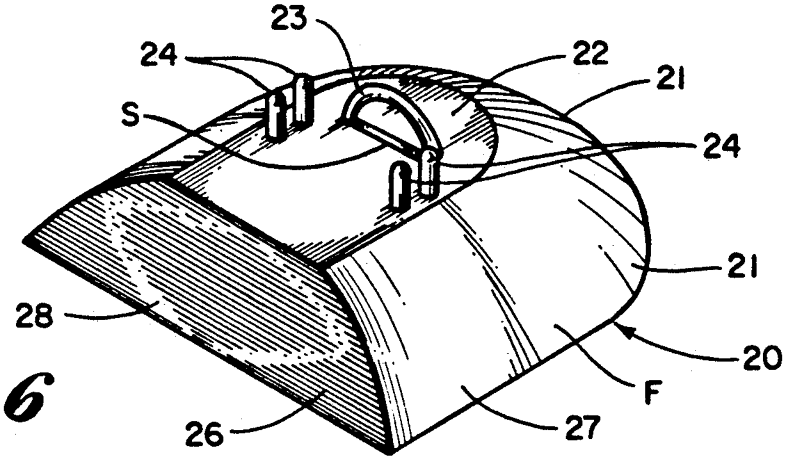
FIG. 6 is a perspective view of another modified balloon holder.
Figure 7:
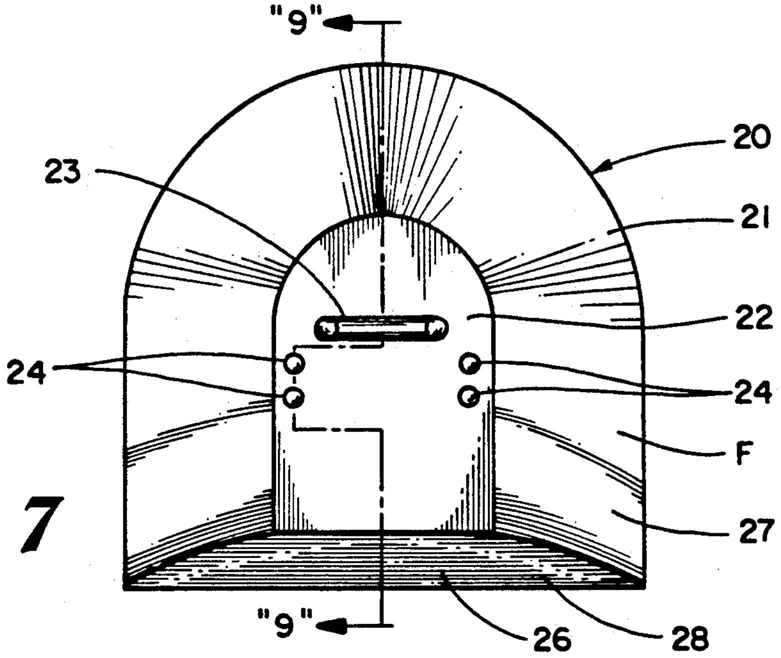
FIG. 7 is a top plan view of the balloon holder shown in FIG. 6.
Figure 8:
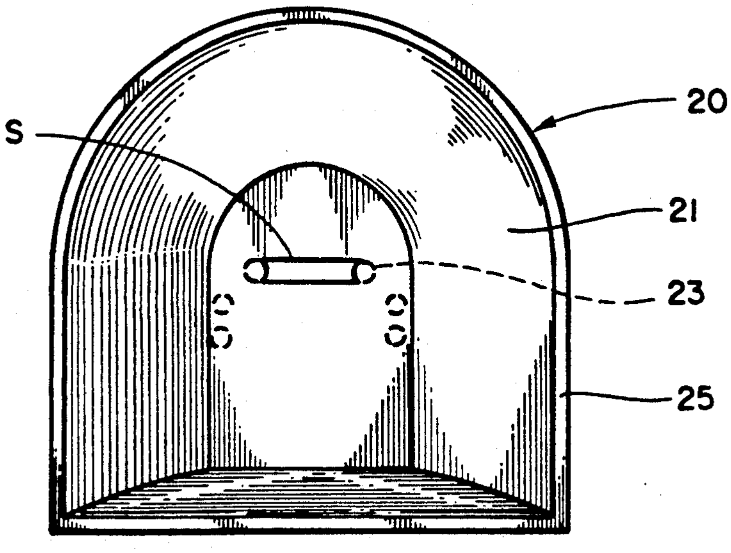
FIG. 8 is a bottom view of the balloon holder shown in FIG. 7.
Figure 9:
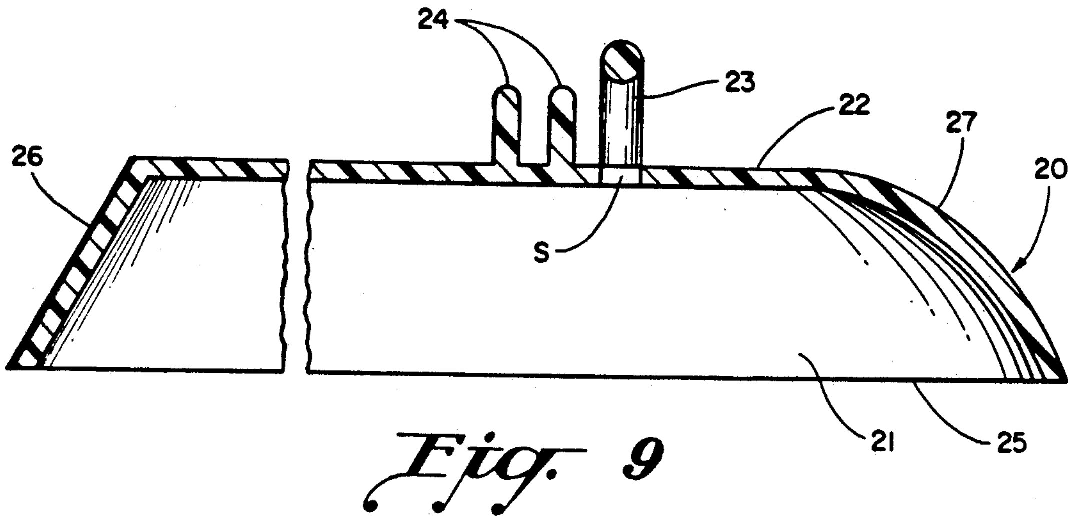
FIG. 9 is a vertical section taken on the line 9—9 looking in the direction indicated by the arrows as seen in FIG. 7.

Loop or arch-shaped balloon tie member 13 is integrally formed with the base or body member 11. This loop or arch-shaped balloon tie member 13 extends through the decal 12 as may be seen in FIG. 4.

It will further be seen that the base or body member 12 is provided with a pair of curved body surfaces 14,14 which form part of the heart-shaped configuration of the base member 11. Mounted upon the curved body surfaces 14,14 and extending upwardly therefrom are a series of greeting card supporting posts or raised extensions 15,15 which posts are arranged in pairs with a pair of the posts being located on each of the curved body surfaces 14,14. The sets of posts are spaced apart so that a greeting card can be readily positioned between the sets of posts and be carried upon the base or body member 12 behind the loop or arch-shaped balloon tie member 13. Thus, when helium balloons are brought into proximity to the base member, the strings on the balloons can be tied to the loop or arch-shaped tie member 13, and the card will be positioned between the posts 15,15 directly behind the balloon strings (not shown).

Figure 3:
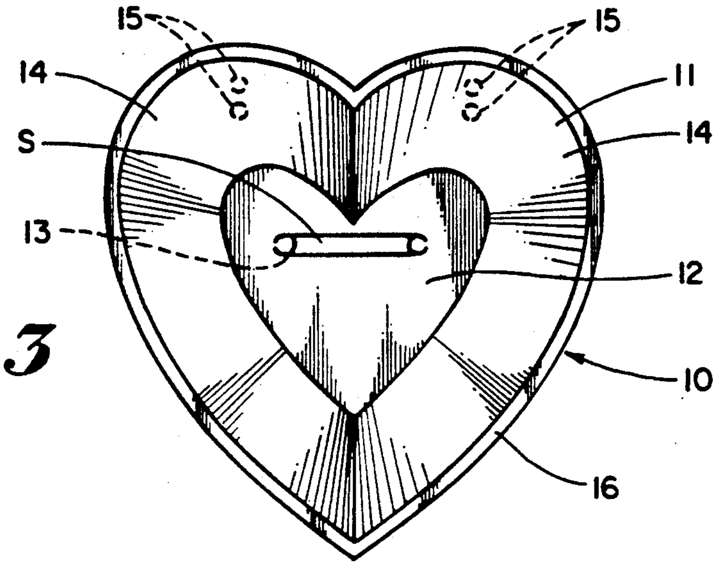
FIG. 3 is a bottom view of the balloon holder shown in FIG. 2.

It will further be observed that the base or body member 11 has a bottom support edge 16 which extends around the base as is seen in FIG. 3. When the base is placed on a table, it is this bottom support edge 16 that engages the table.

It is contemplated that any of my helium party balloon holders can be comprised of any suitable material, and more particularly they can be made of a suitable synthetic plastic. When the plastic is molded, the mold must be used in such a way that in order to form the loop or arch-shaped balloon tie member 13, a slot S must be located in the upper flat surface of the base member as indicated by the dotted lines shown in FIG. 1.

The holder 20 further includes a curved body edge 27 which connects the upper and lower semi-elliptical surfaces 22 and 25. The base or body member 21 further includes a rear flat upright face 26 and advertising 28 can be mounted on this face as may be desired.

The helium party balloon holders disclosed in this application are preferably injection molded using high density polyethylene with color added.

The one critical or semi-critical dimension that is common to the various embodiments of the balloon ports relates to the finger-like projections or posts 15,15 and the distances between the finger-like projections or posts. The objective is that the greeting card will be held as nearly as possible in an upright position. In order to achieve an upright position the finger-like projections or posts 15,15 must not be too far apart. In the preferred embodiment the distance between cooperating associated finger-like projections or each pair of the finger-like projections 15,15 would be 1/16" which is 0.062". That distance can be plus or minus 0.005 or plus 0.067 on the high side or minus 0.057 on the low side.

The reference numeral 20 indicates another of my several preferred forms of my helium party balloon holder, as shown in FIGS. 6–9 inclusive. The balloon holder 20 is comprised of a hollow body member or base member 21 for ground engagement for supporting the holder. The base or body member 21 is generally of a semi-elliptical configuration so that it is particularly adapted for certain types of party events such as birthday parties, anniversaries, and the like. Provided on the base or body member 21 is a flat upper surface 22 which is also generally of a semi-elliptical configuration. The upper surface 22 has a semi-elliptical configuration that is of a smaller size than the semi-elliptical configuration of the base or body member 21, but the two of them are similarly configurated with the upper surface 22 being centered with respect to the outside shape of the base or body member 21. More particularly, a decal is mounted upon the flat surface 22 provided on the top side of the base or body member 21 if desired. The use of the decal is an optional feature.

Loop or arch-shaped balloon tie member 23 is integrally formed with the base or body member 21. This loop or arch-shaped balloon tie member 23 extends through the decal 22 as may be seen in FIG. 9.

Figure 10:
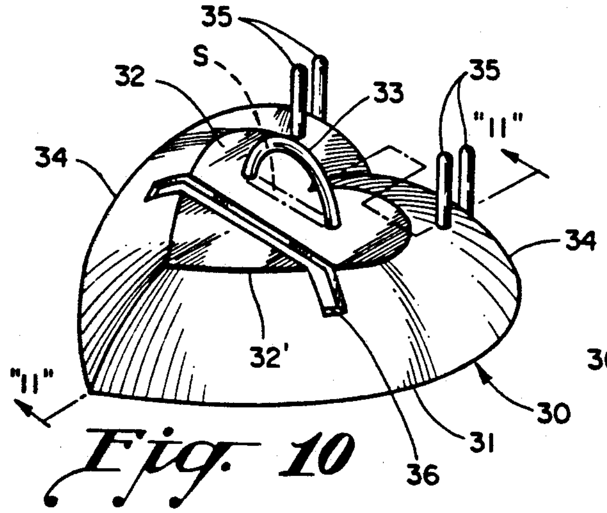
FIG. 10 is a perspective view of a balloon holder similar to FIG. 1 only illustrating another modification.
Figure 11:
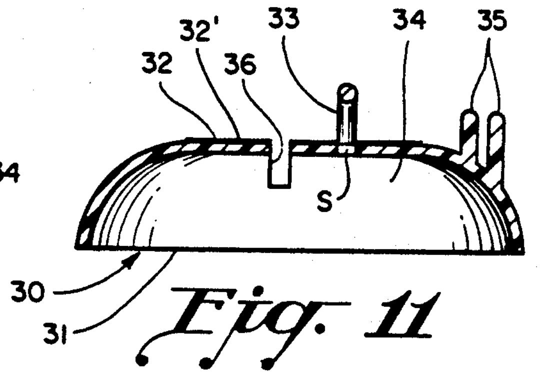
FIG. 11 is a vertical section taken on the line 11—11 looking in the direction indicated by the arrows as seen in FIG. 10.

Referring now to FIGS. 10 and 11, you will see another modified type of helium party balloon holder 30. This holder is identical to the holder 10 except a special card holding slot 36 is provided in a base o body member 31 of the holder 30. This holder 30 also includes a flat upper surface of a heart-shaped configuration similar to the surface 12 relative to the holder 10. Still further, the holder 30 has a loop or arch-shaped balloon tie member 33, and a pair of conical surfaces 34,34 which serve to join the upper heart-shaped surface 32 with the lower edge of the holder as seen in FIG. 10. Located beneath the arch-shaped balloon tie member 33 is a slot S which serves the purpose as previously described. Still further, the holder has a pair of curved body surfaces 34,34 similar to the surfaces 14,14 with respect to the holder 10. Also mounted on the holder 30 are pairs of posts 35,35, which are arranged as two sets of posts on opposite sides of the loop or arch-shaped balloon tie member 33. A card holding slot 36 is provided and it extends across the flat surface 32 and a decal 32' carried on the flat surface 32. The groove 36 also extends into the curved surfaces identified at 34,34.

Figure 12:
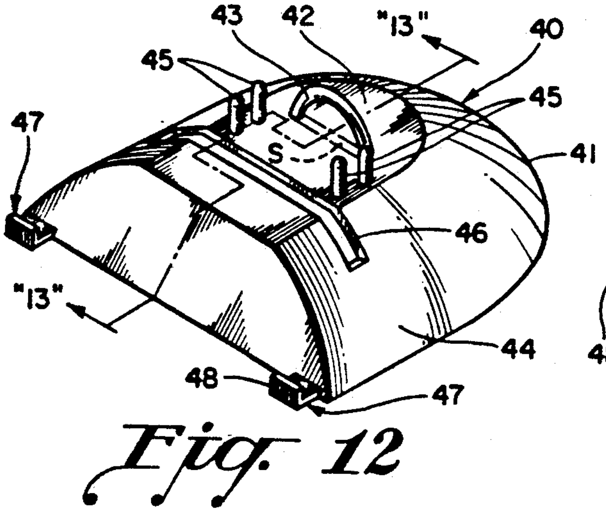
FIG. 12 is a perspective view of still another modified balloon holder similar to the one shown in FIG. 6 but showing a modified card holder arrangement.
Figure 13:
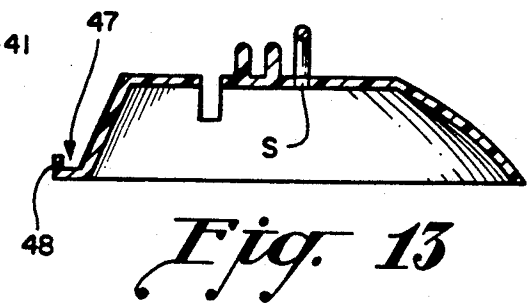
FIG. 13 is a vertical section taken on the line 13—13 looking in the direction indicated by the arrows as seen in FIG. 12.
Figure 14:
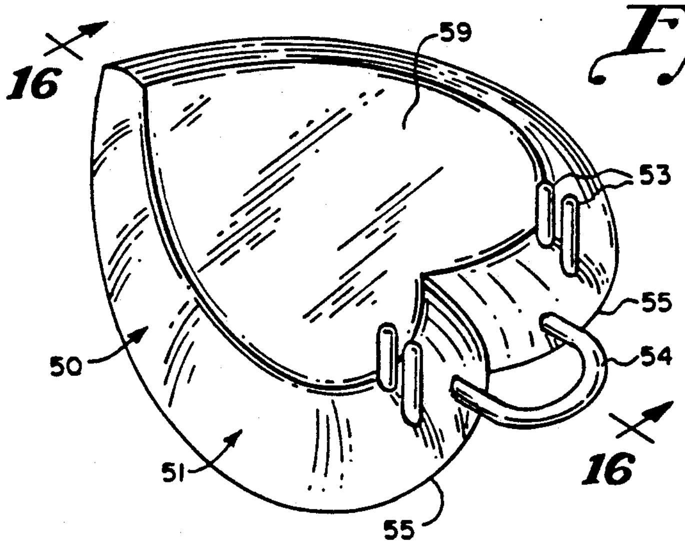
FIG. 14 is a perspective view of still another type of balloon holder embodying important features of my invention.
Figure 15:
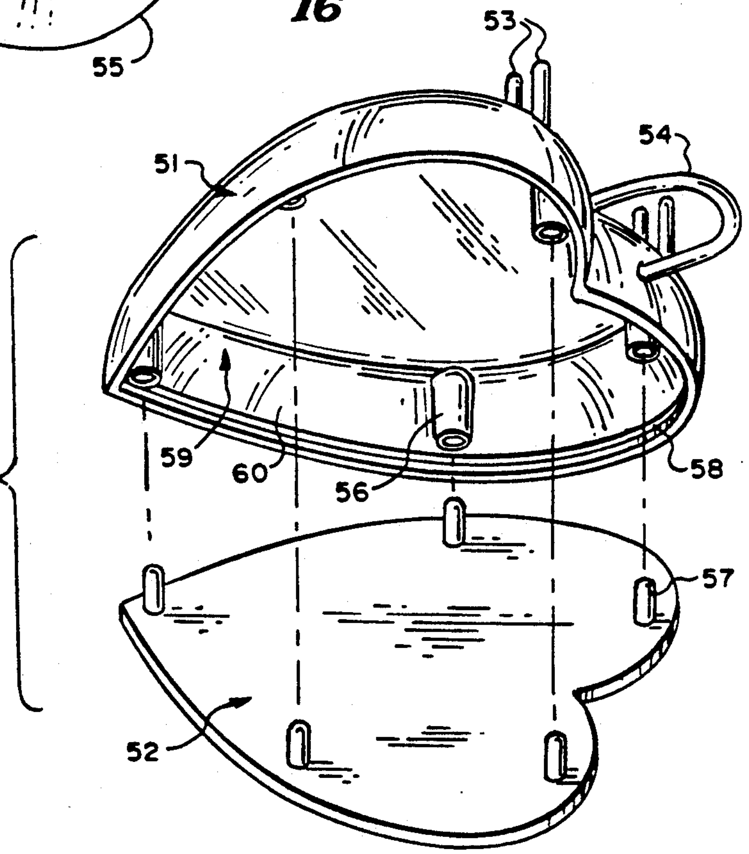
FIG. 15 is an exploded view of the balloon holder shown in FIG. 14.

Shown in FIGS. 12 and 13 is still yet another type of a helium party balloon holder 40. This holder 40 is similar to the holder 20, only a slot 46 similar to slot 36 is provided as will now be described in further detail. Now further, with regard to the holders 30 and 40, each holder has two different ways for a greeting card to be supported on the holder in an upright manner as evidenced by the posts 35,35 and 45,45 and the slots 36,46. The holder 40 further has a flat upper surface 42, a loop or arch-shaped balloon tie member 43 and curved outer surface 44. These components were all previously described. Further provided on the holder are a pair of finger-like card supporting projections 47,47 which provides still a third way for a greeting card to be carried on the holder 40 with an upper portion of the greeting card bearing against the holder and the lower edge of the greeting card would be carried by the feet or finger-like projections 47,47. The finger-like projections 47,47 also possess upwardly extending legs 48,48 to resist accidental disengagement of a greeting card from the finger-like projections 47,47. When a greeting card is mounted on the finger-like projections 47,47, the back side of the card can lean against the holder to further support the card in an upright position.

The reference numeral 50 indicates generally still another type of ballast or sand filled balloon holder. The balloon holder 50 includes an upper heart-shaped section or a shell-shaped base member 51 and a closure section 52. When the closures 51 and 52 are assembled, ballast or sand indicated at S in FIG. 3 can be contained within the balloon holder container to provide an added weight so that when balloons are attached to the balloon holder, the balloon holder will remain in place.

In accordance with my invention, the balloon holder 50 further includes two pairs of pines 53—53 which provide means for holding a greeting card in place on top of the balloon holder 50. Also provided on the balloon holder 50 is an arch shaped balloon attachment member 54 which has its opposite ends formed integral with lobes 55—55 on the heart-shaped balloon member 51 so that one end is joined with one lobe and the end is joined with the other lobe. The member 54 extends generally at right angles to the pins 53—53, and is located at an upper or forward end of the heart-shaped balloon holder 50. The strings of balloons can be tied to the balloon attachment member 54 to secure them to the balloon holder 50.

Now in order to secure the components of the balloon holder 50 together, including the upper heart-shaped member 51 and the heart-shaped closure member 52, a series of bosses 56 are molded integral on an inside area 59 and to interior sidewalls 60 of the heart-shaped balloon holder 50. Attached to the heart-shaped closure member 52 are a series of pins 57 which are integral with the closure member 52. These pins are telescopingly engageable within the bosses or sockets 56 to enable the closure member 52 to be securely fastened with the upper heart-shaped member 51.

The interior wall 60 of the heart-shaped member 51 is provided with an L-shaped annular seat 58 so that the closure member 52 can be snuggly bottomed against the seat 58 in such a way that a bottom surface 61 of the closure member will lie in a co-planer with annular bottom surface 62 of the upper heart-shaped member 51. By providing this type of snug engagement between the closure member 52 and the upper heart-shaped member 51, there is less likelihood for any sand or ballast S to leak from the container defined by the upper and lower engaged members 51 and 52, and also the balloon holder can lie flat and be fully supported upon a table surface for a birthday party or anniversary party and the like.

Figure 16:
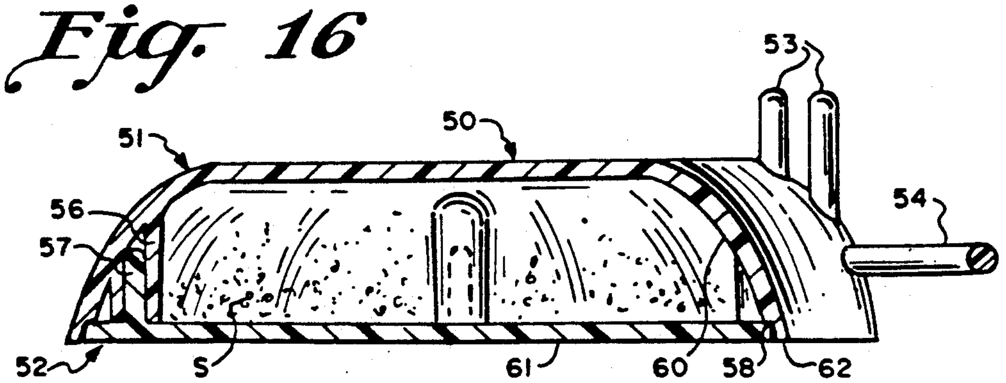
FIG. 16 is a vertical section taken on a line 16—16 looking in the direction indicated by the arrows as seen in FIG. 14.

The pins 53 in each pair are of a different vertical height as shown in FIG. 16. The shorter pin engages the curved lobe at a higher point than does the longer pin, and these pins are formed integral as molded components with the upper heart-shaped section 51. With both pins having lower end positioned above the arcuate-shaped integral member 54. It will further be noted that the uppermost pin 53 lies immediately adjacent to the flat heart-shaped surface area 59. Messages and words of endearment can be provided on the flat heart-shaped area 57 if desired, either by adding decals or by providing a suitable writing surface.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. A balloon holder for a lighter than air gas filled balloon including a synthetic plastic base member for ground engagement for supporting the holder, an upstanding arch-shaped ring member integrally formed with said base member and extending upwardly therefrom from a medial location on the base member ,and greeting card holding means for holding a greeting card in an upright position, said means being positioned adjacent to said arch-shaped ring member carried by said base member in integral assembly therewith; said greetings card holding means acting independently of said arch-shaped ring member to hold the greeting cards in an upright position.

2. The balloon holder of claim 1 wherein said greeting card holding means is provided comprised of spaced finger-like posts oriented for supporting a greeting card between the projections.

3. The balloon holder of claim 2 wherein said projections are arranged in two sets of posts and with the sets being spaced apart for supporting a greeting card at spaced locations providing two separate support points for the greeting card.

4. The balloon holder of claim 1 wherein said card holding means comprising a groove formed in said base member adjacent to said arch-shaped ring member carried by said base member in integral assembly therewith.

5. The balloon holder of claim 1 wherein the base member has an outer perimeter for supporting the base member, said base member having a heart shape, said base members having a centrally located flat surface, said upstanding arch-shaped ring member being extending upwardly from said flat surface.

6. The balloon holder of claim 1 further characterized by a the base having an upper semi-elliptically shaped upper surface bearing said medial location carrying said arch-shaped ring member.

7. The balloon holder of claim 6 further characterized by said base member having a semi-elliptically shaped lower edge beneath said semi-elliptically shaped upper surface for supporting said base member in ground engagement.

8. The balloon holder of claim 7 further characterized by said base member having an inclined upwardly extending end surface connected at its lower end to said semi-elliptically shaped lower edge and merged at its upper end with said semi-elliptically shaped upper surface.

9. The balloon holder of claim 1 wherein a greeting card holding means is provided comprised of spaced finger-like card supporting projections extending outwardly from said base for carrying lower edges of a greeting card when mounted thereon.

10. A balloon holder for a lighter than air gas filled balloon including a synthetic plastic base member having a pan shape with an annular edge for ground engagement for supporting the holder, an upstanding loop-shaped ring member integrally formed with said base member and extending upwardly therefrom from a medial location on the base member, and greeting card holding means for holding a greeting card in an upright position, said means being positioned adjacent to said arch-shaped ring member carried by said base member in integral assembly therewith, said greeting card holding means is comprised of spaced finger-like posts oriented for supporting a greeting card between the projections.

11. The balloon holder of claim 10 wherein said projections are arranged in two sets of posts and with the sets being spaced apart for supporting a greeting card at spaced locations providing two separate support points for the greeting card.

12. The balloon holder of claim 10 wherein the annular edge has a heart shape, said base member having a centrally located flat surface for carrying advertising, said upstanding loop-shaped ring member being extending upwardly from said flat surface.

13. In combination, a helium balloon holder and a helium balloon having a ballon string, said holder including a synthetic plastic base member for ground engagement for supporting the holder, an upstanding arch-shaped ring member integrally formed with said base member and extending upwardly therefrom from a medial location on the base member, said balloon string being attached to said ring member, and greeting card holding means for holding a greeting card in an upright position, said means being positioned adjacent to said arch-shaped ring member carried by said base member in integral assembly therewith; said greetings card holding means acting independently of said arch-shaped ring member to hold the greeting cards in an upright position.

14. The combination of claim 13 wherein said greeting card holding means is comprised of spaced raised projections oriented for supporting a greeting card between the projections.

15. The combination of claim 13 wherein said greeting card holding means is comprised of spaced raised projections oriented for supporting a greeting card between the projections, and a greeting card supported in an upright position by said raised projections on said holder.

16. The combination of claim 15 wherein said projections are arranged in two sets of posts and with the sets being spaced apart for supporting said greeting card at spaced locations providing two separate support points for the greeting card.

17. The combination for claim 13 wherein said card holding means comprises a groove formed in said base member adjacent to said arch-shaped ring member carried by said base member in integral assembly therewith.

18. The combination of claim 13 wherein the base member has an outer perimeter for supporting the base member, said base member having a heart shape, said base member having a centrally located flat surface, a decal mounted in attached engagement with said flat surface for carrying advertising thereon, said upstanding arch-shaped ring member being extended upwardly from said flat surface.

19. In combination, a helium balloon holder and a helium balloon having a balloon string, said holder including a base member for ground engagement for supporting the holder, an arch-shaped ring member integrally formed with said base member and extending outwardly therefrom, said balloon string being attached to said ring member, greeting card holding means for holding a greeting card in an upright position, said means being positioned adjacent to said arch-shaped ring member carried by said base member in integral assembly therewith, and a greeting card mounted on said holder and being supported in an upright position by said greeting card holding means free of said ring member.

20. The combination of claim 19 wherein said greeting card holding means is comprised of spaced raised projections oriented for supporting a greeting card between the projections.

21. The combination of claim 19 wherein said greeting card holding means is comprised of spaced raised projections oriented for supporting a greeting card between the projections, and a greeting card supported in an upright position by said raised projections on said holder.

22. The combination of claim 21 wherein said projections are arranged in two sets of posts and with the sets being spaced apart for supporting said greeting card at spaced locations providing two separate points of support for the greeting card.

23. The combination of claim 19 wherein said base member is shell-shaped and has a closure section on its underside, and means for removably attaching the closure section to said base member in sealed assembly thus enabling ballast to be carried within the shell-shaped base member when said closure section is assembled therewith.

24. The combination of claim 19 wherein said arch-shaped ring member extending in a direction generally away from and at right angles to said card holding means.

25. The combination of claim 20 wherein said arch-shaped ring member extends generally at right angles away from said raised projections and forwardly of said base member.

26. The combination of claim 20 wherein said arch-shaped ring member extends generally at right angles away from said raised projections and forwardly of said base member, said base member being generally heart-shaped in configuration and having two lobes, the arch-shaped ring member having end portions with one of said end portions being connected to one of the said lobes and with the other of said end portions being connected to another of said lobes.

27. A balloon holder for a lighter than air gas filled balloon and shaped for receiving ballast internally thereof including a synthetic plastic shell-shaped base member for ground engagement for supporting the holder, an outwardly extending ring member integrally formed with said base member and extending outwardly therefrom, greeting card holding means for holding a greeting card in an upright position, said means being positioned adjacent to said ring member carried by said base member in integral assembly therewith, a base plate mounted on an underside of said shell-shaped base member, and connecting means for securing said shell shaped base member and said base member together to provide a closed container for housing ballast therein.

28. The combination of claim 27 wherein said arch-shaped ring member extending in a direction generally away from and at right angles to said card holding means.

29. The combination of claim 27 wherein said arch-shaped ring member extends generally at right angles away from said raised projections and forwardly of said base member.

30. The combination of claim 27 wherein said greeting card holding means comprises raised projections, said arch-shaped ring member extends generally at right angles away from said raised projections and forwardly of said base member, said base member being generally heart-shaped in configuration and having two lobes, the arch-shaped ring member having end portions with one of said end portions being connected to one of the said lobes and with the other of said end portions being connected to another of said lobes.

31. The holder of claim 27 further characterized by said connecting means comprising pins and sockets with the pins retainingly wedged in said sockets.

32. A balloon holder for lighter than air gas filled baloon and shaped as a cntainer for receiving ballast internally thereof including a synthetic plastic base member for ground engagement for supporting the holder, an outwardly extending ring member integrally formed with said base member and extending outwardly therefrom, greeting card holding means for holding a greeting card in an upright position, said means being positioned adjacent to said ring member carried by said base member in integral assembly therewith, said greeting card holding means acting independently of said outwardly extending ring member to hold a greeting card in an upright position.

33. The holder of claim 32 wherein said ring member extends in a direction generally away from and at right angles to said card holding means.

34. The holder of claim 32 wherein said ring member extends generally at right angles away from said raised projections and forwardly of said base member and lies in a plane extending beneath said greeting card holding means.

35. The combination of claim 32 wherein said greeting card holding means comprises raised projections, said ring member extends generally at right angles away from said raised projections and forwardly of said base member, said base member being generally heart-shaped in configuration and having two lobes, the ring member having end portions with one of said end portions being connected to one of the said lobes and with the other of said end portions being connected to another of said lobes.

* * * * *